US008609054B2

(12) United States Patent
Stanic et al.

(10) Patent No.: US 8,609,054 B2
(45) Date of Patent: Dec. 17, 2013

(54) HYDROGEN PRODUCTION FROM BOROHYDRIDES AND GLYCEROL

(75) Inventors: Vesna Stanic, West Palm Beach, FL (US); Daniel Augusto Betts Carrington, Parkland, FL (US)

(73) Assignee: EnerFuel, Inc., West Palm Beach, FL (US)

(*) Notice: Subject to any disclaimer, the term of this patent is extended or adjusted under 35 U.S.C. 154(b) by 854 days.

(21) Appl. No.: 12/600,807

(22) PCT Filed: May 19, 2008

(86) PCT No.: PCT/US2008/006400
§ 371 (c)(1),
(2), (4) Date: Apr. 19, 2010

(87) PCT Pub. No.: WO2008/144038
PCT Pub. Date: Nov. 27, 2008

(65) Prior Publication Data
US 2010/0196242 A1  Aug. 5, 2010

Related U.S. Application Data

(60) Provisional application No. 60/938,832, filed on May 18, 2007.

(51) Int. Cl.
*C01B 3/02*     (2006.01)
*C01B 35/12*    (2006.01)
*H01M 8/06*     (2006.01)

(52) U.S. Cl.
USPC ............... 423/277; 423/648.1; 429/421

(58) Field of Classification Search
USPC ........................... 423/277, 648.1
See application file for complete search history.

(56) References Cited

U.S. PATENT DOCUMENTS

2003/0099876 A1   5/2003   Finkelshtain et al.
2006/0042162 A1   3/2006   Goldstein et al.
(Continued)

FOREIGN PATENT DOCUMENTS

WO          03006366 A1      1/2003
WO     WO 2005/102914 A2    11/2005
WO          2007001164 A1    1/2007

OTHER PUBLICATIONS

Communication from EPO regarding EP Patent Application No. 08754542.2, mailed Mar. 23, 2012.
(Continued)

*Primary Examiner* — Wayne Langel
(74) *Attorney, Agent, or Firm* — Armstrong Teasdale LLP

(57) ABSTRACT

A method of forming hydrogen gas comprises the steps of providing a reactor and providing a hydrogen-generating composition to the reactor. The hydrogen-generating composition consists essentially of a borohydride component and a glycerol component. The borohydride, e.g. sodium borohydride, and glycerol components are present in a generally three (3) to four (4) stoichiometric ratio, prior to reaction. The borohydride component has hydrogen atoms and the glycerol component has hydroxyl groups with hydrogen atoms. The method further comprises the step of reacting the borohydride component with the glycerol component thereby converting substantially all of the hydrogen atoms present in the borohydride component and substantially all of the hydrogen atoms present in the hydroxyl groups of the glycerol component to form the hydrogen gas. The reaction between the borohydride component and the glycerol component is an alcoholysis reaction. Reactors and reaction systems employing the method of the present invention are also described.

34 Claims, 10 Drawing Sheets

(56) References Cited

U.S. PATENT DOCUMENTS

2007/0003475 A1\* 1/2007 Lim et al. .................. 423/648.1
2007/0068071 A1 3/2007 Kelly et al.

OTHER PUBLICATIONS

International Search Report in International Patent Application No. PCT/US08/06400.

\* cited by examiner

HYDROGEN PRODUCTION FROM BOROHYDRIDES AND GLYCEROL

CROSS-REFERENCE TO RELATED APPLICATIONS

This application is a §371 national stage entry of International Application No. PCT/US2008/006400, filed May 19, 2008, which claims priority to U.S. Provisional Application No. 60/938,832, filed May 18, 2007, both of which are hereby incorporated by reference.

FIELD OF THE INVENTION

The present invention generally relates to a method of forming hydrogen gas utilizing a solvolysis reaction, more specifically to a method of forming hydrogen gas utilizing an alcoholysis reaction of a borohydride component and a glycerol component to form hydrogen gas and to reactors employing the method of the present invention.

DESCRIPTION OF THE RELATED ART

Hydrogen fuel cells are electrochemical devices that convert chemical energy stored in hydrogen and oxygen into water, electrical energy, and thermal energy. Elemental oxygen ($O_2$) is an abundant component present within air and thus can be easily conveyed to a hydrogen fuel cell. Conversely, elemental hydrogen ($H_2$) is not readily available in nature. Consequently, hydrogen must be stored within devices that employ the hydrogen fuel cell. Electrical energy production of such devices is directly dependent on the amount of hydrogen stored in the device and efficiency of the overall system.

Storage of large quantities of hydrogen in small volumes and with minimal mass is very important for the commercialization of devices employing hydrogen fuel cells. In practice, hydrogen storage is complicated due to the low volumetric energy density of hydrogen gas. For example, to store large amounts of chemical energy in the form of hydrogen gas necessitates a large volume. Further, even under pressure (to condense the hydrogen gas) liquid hydrogen has almost five (5) times less volumetric energy density than conventional liquid gasoline. In order to reduce volume requirements of the hydrogen, chemical hydrogen storage methods have been developed and employed. Examples of such chemical storage methods include the use of compounds having "bound-up" hydrogen atoms, such as metal hydrides, hydrocarbons, and chemical hydrides. Such compounds can be reacted to release hydrogen gas. A common reaction scheme employed is a hydrolysis reaction between a metal or chemical hydride and water to form hydrogen.

Some chemical hydrides, such as sodium borohydride, have very high volumetric and gravimetric hydrogen densities. For example, one (1) gram of sodium borohydride diluted in four (4) grams of water has approximately five (5) mL volume, and produces 0.21 grams of hydrogen (2.6 L at room temperature and pressure). To store the same amount of hydrogen gas in the same volume at 25° C., without use of the sodium borohydride, would require compression to 1,287 atmospheres (~18,914 psig or ~130,401 kPa). Of the readily available chemical hydrides, sodium borohydride has the highest specific hydrogen yield with the lowest specific energy release. These characteristics coupled with sodium borohydrides chemical and thermal stability have made sodium borohydride an especially attractive hydrogen storage option for devices employing hydrogen fuel cells.

As introduced above, typically, a hydrolysis reaction is used to release the hydrogen from the sodium borohydride. Specifically, hydrogen gas is released from sodium borohydride reacting with water via the hydrolysis reaction, as illustrated below by simplified Reaction Scheme I.

$$NaBH_4 + 4H_2O \rightarrow 4H_2(g)\uparrow NaB(OH)_4 + heat \quad \text{Reaction Scheme I}$$

The hydrolysis reaction illustrated above by Reaction Scheme I is exothermic, and thus generally occurs spontaneously at any temperature without external heat addition. In addition to the hydrogen gas and heat, sodium metaborate ($NaB(OH)_4$) is a by-product of the hydrolysis reaction. Referring to Reaction Scheme I, a theoretical hydrogen production ratio can be calculated as a ratio of the masses of the produced hydrogen gas relative to reactants (i.e., the sodium borohydride and water). Based on Reaction Scheme I, the total weight of reactants is 110 grams per mole of sodium borohydride. Since 8 grams of hydrogen (or 4 moles) are produced per one (1) mole of reacted sodium borohydride consumed, the theoretical hydrogen production ratio is 7.27 wt %, which is calculated as a ratio of 8 grams of hydrogen over 110 grams of reactants.

Unfortunately, conventional hydrogen generating systems that employ the hydrolysis reaction of the sodium borohydride and the water are flow reactors that require both the sodium borohydride and the sodium metaborate to be completely dissolved in the water. In most applications, this requirement drastically decreases the theoretical hydrogen production ratio of these systems because excess water is needed to dissolve the sodium metaborate. This is primarily due to the solubility limit of sodium metaborate being 5.2 wt %, as compared to the solubility limit being 35.5 wt % for sodium borohydride. To keep the sodium metaborate in solution (with both the water and the sodium borohydride), the reaction mixture must be diluted with excess water to at least to the sodium metaborates solubility limit. Unfortunately, such dilution with excess water results in a maximum hydrogen production ratio of only 0.4 wt %. Further, due to this low hydrogen content weight percent, many of the aforementioned hydrogen generation systems require the use of expensive and complicated water reclamation systems.

It has been shown in the art that a rate of reaction of the hydrolysis reaction of the sodium borohydride and the water is very slow and is dependent on pH of the solution. High pH (i.e., the reaction mixture being an alkaline solution) decreases the rate of the hydrolysis reaction, while low pH (i.e., the reaction mixture being an acidic solution) increases the rate of the hydrolysis reaction. Unfortunately, since the sodium metaborate (i.e., the by-product of the hydrolysis reaction) is basic, continuous generation of the sodium metaborate over time during the hydrolysis reaction continuously increases pH of the solution (thus driving the solution basic or alkaline), which continuously slows down the hydrolysis reaction over time. Such slowing of the hydrolysis reaction reduces the output of the hydrogen gas from the hydrolysis reaction. As such, acids, buffers, or solid catalysts are commonly used in an effort to increase the reaction rate of the hydrolysis reaction. Application of heat can also be used to increase the reaction rate of the hydrolysis reaction.

Unfortunately, employing additional components (e.g. solid catalysts) or applying heat adds additional production costs for making the hydrogen. Further, solid catalysts suffer inherent physical and chemical limitations. For example, the effectiveness of solid catalysts depends highly on the solid catalysts probable contact with the reactants of the hydrolysis reaction. Therefore, catalyst surface area is a key factor that affects the rate of hydrolysis reaction. Also, solid catalysts are susceptible to fouling due to impurities or reaction by-products. This is especially the case with the hydrolysis reaction of the sodium borohydride and the water, where the by-product, sodium metaborate, is less soluble in water than the sodium borohydride, as described above. This solubility difference creates conditions for localized deposition of the sodium metaborate at catalyst active sites, thereby fouling the solid catalyst. This deposition problem is typically resolved with the addition of excess water that results in the problems described above, e.g. yielding a lower hydrogen storage capacity of the hydrolysis reaction. Other disadvantages of employing such solid catalysts are cost, degradation of the solid catalyst over time, and limitations on the hydrolysis reaction temperature and pressure conditions caused in part by physical frailties of the solid catalyst.

In view of the foregoing, there remains an opportunity to provide new methods of producing hydrogen different than conventional methods that employ hydrolysis reactions. There also remains an opportunity to provide new methods of producing hydrogen that do not require the use of excess water and/or solid catalysts. There yet also remains an opportunity to develop reactors and reaction schemes employing such new methods of producing hydrogen.

SUMMARY OF THE INVENTION AND ADVANTAGES

The subject invention provides a method of forming hydrogen gas. The method comprises the steps of providing a reactor and providing a hydrogen-generating composition to the reactor. The hydrogen-generating composition consists essentially of a borohydride component and a glycerol component. The borohydride and glycerol components are present in a generally three to four stoichiometric ratio, prior to reaction. The borohydride component has hydrogen atoms and the glycerol component has hydroxyl groups with hydrogen atoms. The method further comprises the step of reacting the borohydride component with the glycerol component thereby converting substantially all of the hydrogen atoms present in the borohydride component and substantially all of the hydrogen atoms present in the hydroxyl groups of the glycerol component to form the hydrogen gas. Reactors and reaction systems employing the method of the present invention are also provided.

The method of the present invention provides for increased hydrogen formation relative to conventional hydrolysis reactions and systems. The method of the present invention employs an alcoholysis reaction between the borohydride component and the glycerol component to form the hydrogen. Generally, the alcoholysis reaction does not require a catalyst component for forming the hydrogen. Further, water is generally not necessary. Not using the catalyst component and water can be useful for preventing fouling problems and for reducing costs, and is useful for forming increased amounts of hydrogen. The reactors and reaction systems employing the method of the present invention can readily be used to supply hydrogen in various quantities, and can be used to supply hydrogen when required such as to a device using a hydrogen fuel cell. The alcoholysis reaction of the present invention can also form by-products, which can be useful in various industries, e.g. pharmaceutical and chemical industries. The present invention also provides simple, scalable, and efficient methods for increasing and controlling hydrogen formation, examples of such control methods include temperature changes, pressure changes, and viscosity changes, mixing the composition, and/or use of catalyst, surfactants, and pH components. Due to the alcoholysis reaction of the present invention, if acids are employed, amounts of acid can be reduced relative to conventional hydrolysis reaction systems.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
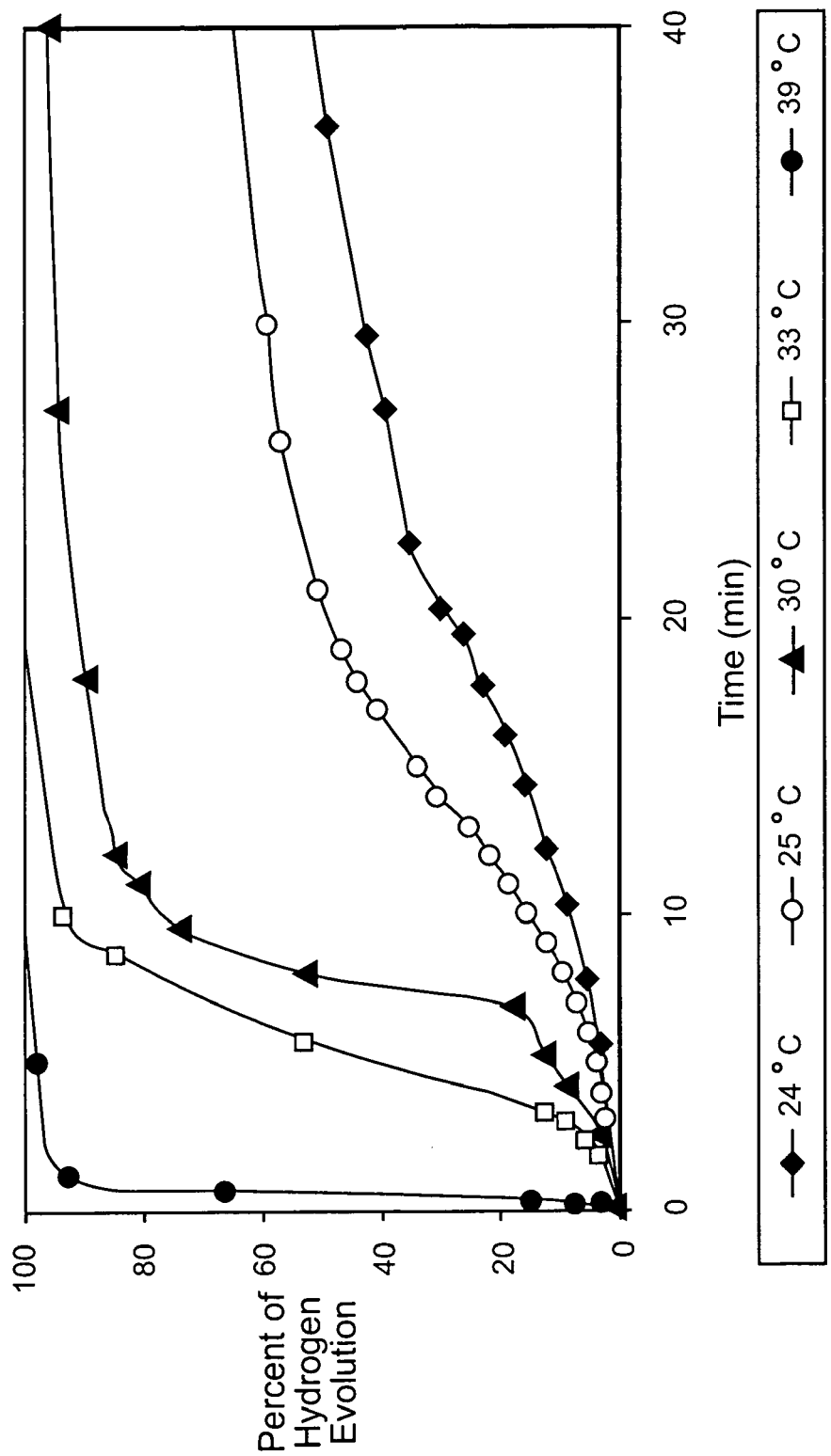
FIG. 1 is a graph illustrating hydrogen formation from the method of the present invention carried out at varying temperatures.

The present invention provides a method of forming hydrogen ($H_2$) gas. Hydrogen gas formed from the method of the present invention can be used for various purposes. For example, hydrogen gas is especially useful for various industrial processes and electrochemical energy conversion devices, such as devices that employ hydrogen fuel cells. Hydrogen fuel cells, depending on their size, shape, and configuration, can be relatively low or relatively high in power, and can be used for a variety of applications, such as for automobiles and for electronic devices. The hydrogen fuel cells can be light in weight. Hydrogen is also used for many chemical and industrial applications. For example, large quantities of hydrogen are used in the petroleum and chemical industries. One of the largest applications of hydrogen is for processing (or "upgrading") of fossil fuels. Common "consumers" of hydrogen in petrochemical plants include hydro-dealkylation, hydro-desulfurization, and hydro-cracking processes. Other uses of hydrogen include, but are not limited to, hydrogenation of fats and oils; manufacturing of hydrochloric acid; welding; reduction of metallic ores; rocket fuel; rotor coolant in electrical generators; and cryogenic research, e.g. superconductivity studies. It is to be appreciated that the present invention is not limited to any particular use of the hydrogen formed from the method of the present invention. Further, depending on temperature and pressure conditions, the hydrogen may be in the form of gas or liquid. Typically, the hydrogen is in the form of gas as described herein, unless noted otherwise.

The method of the present invention comprises the step of providing a reactor. The reactor can be any conventional reactor known in the art. Typically, the reactor is selected from the group of a batch reactor, a semi-batch reactor, and a continuous-flow reactor (CFR). Various reactor embodiments of the present invention are described in further detail below. It is to be appreciated that the method of the present invention may be employed using a combination of two or more reactors, with the reactors being the same as or different than each other.

The method of the present invention further comprises the step of providing a hydrogen-generating composition to the reactor. The hydrogen-generating composition, hereinafter the composition, may be formed outside of the reactor and then introduced into the reactor, more typically, individual components that make up the composition are introduced into the reactor and combined at some point in time to form the composition. As such, the reactor generally includes one or more inlets for providing the composition (and/or the components thereof) to the reactor. It is to be appreciated that a portion of the composition can first be formed outside of the reactor, such as in an inlet pipe or an outer storage tank, and a remaining portion of the composition can be formed inside the reactor. The reactor typically includes one or more outlets for removing the hydrogen gas from the reactor, during and/or after formation of the hydrogen gas. The outlet (or outlets) can also be used to remove components of the composition, the composition itself, and/or products other than hydrogen gas (e.g. by-products, which are described further below) from the reactor. It is to be appreciated the inlet and the outlet of the reactor can be one and the same, such as with a batch reactor system, however, the inlet and the outlet are typically different from each other, such as with a semi-batch reactor, a continuous-flow reactor, or other types of batch reactor systems. Flow rates of the inlet and outlet can be controlled by various methods known in the art, such as with pumps and/or valves attached thereto. As such, the reactor may be completely closed off during formation of the hydrogen gas, such as in a batch reaction process, or left partially open during formation of the hydrogen gas, such as in a semi-batch reaction process or continuous-flow reaction process. Depending on the specific reactor system employed, hydrogen can be produced in relatively small to relatively large quantities for later use, or can be produced when required for substantially instantaneous use of the hydrogen. Several embodiments employing specific types of reactors and reactor systems are further described below in detail.

The composition consists essentially of a borohydride component and a glycerol component. The composition may further include some amount of other components, as described further below, as long as such other components do not hinder formation of hydrogen gas from reaction between the borohydride and glycerol components, which is also described further below. In one embodiment, the composition consists of the borohydride component and the glycerol component.

The borohydride component can comprise one or more conventional borohydrides known in the art. The borohydride component is generally of the simplified formula $MB_xH_y$, wherein M is typically a metal and subscripts x and y are typically integers, more typically subscript x is one (1) and subscript y is four (4). In certain embodiments, the borohydride is selected from the group of sodium borohydride ($NaBH_4$), lithium borohydride ($LiBH_4$), potassium borohydride ($KBH_4$), rubidium borohydride ($RbBH_4$), and combinations thereof; however, it is to be appreciated that other borohydrides may also be used, as described above. As shown in the formulas above, the borohydride component has hydrogen atoms; typically the borohydride component has four (4) hydrogen atoms. Suitable grades of borohydrides, for purposes of the present invention, are commercially available from a variety of commercial suppliers.

In one embodiment, the borohydride component comprises sodium borohydride, which is also referred to in the art as sodium tetrahydroborate. This embodiment is especially useful because it is believed that the sodium borohydride has the highest specific hydrogen yield with the lowest specific energy release relative to other borohydrides, such as those described and exemplified above. Further, it is also believed that the sodium borohydride has excellent chemical and thermal stability relative to other borohydrides. For example, as understood in the art, sodium borohydride generally melts at ~400° C., and generally thermally decomposes at temperatures higher than ~400° C. Further, sodium borohydride is generally soluble in water and methanol; however, sodium borohydride tends to react with both unless a strong base is added to suppress solvalysis, specifically hydrolysis, as described above and as illustrated by Reaction Scheme I. Suitable grades of sodium borohydride, for purposes of the present invention, are commercially available from a variety of commercial suppliers.

The borohydride component comprises borohydride particles of various size and shape. Typically the borohydride particles are in the form of a powder, however, the powder can also be confectioned into larger sizes and shapes, such as granules, beads, and pills. Generally, to facilitate reaction of the borohydride particles, increased surface area of the borohydride particles is preferred relative to borohydride particles having lower surface areas. Specifically, in certain embodiments, the borohydride particles have an average particle diameter of less than about 300 micrometers (μm), alternatively less than about 200 micrometers, alternatively less than about 100 micrometers.

Increased surface area and reduced particle size of the borohydride powder can be achieved by various methods. One example of a suitable method for obtaining higher surface area of the powder is to deagglomerate the borohydride particles by suspending the powder in a carrier fluid (or a non-solvent/hydrophobic media). Specifically, in certain embodiments, the borohydride component further comprises the carrier fluid. As such, when the carrier fluid is employed, the borohydride particles are suspended in the carrier fluid. If employed, the carrier fluid can be any conventional carrier fluid known in the art. Typically, the carrier fluid is selected from the group of mineral oil; petroleum jelly; saturated vegetable, plant, and animal oils and fats; non-saturated vegetable, plant, and animal oils and fats; and combinations thereof. In one embodiment, the carrier fluid is mineral oil. If employed as the carrier fluid, mineral oil can readily be recycled and recharged for subsequent use, as described further below.

Another example of a suitable method for obtaining higher surface area of the powder is to grind the powder. Suitable apparatuses for grinding the powder include, but are not limited to, conventional ball mills, such as planetary ball mills. To prevent the borohydride particles from agglomeration, the powder is typically mixed with surfactants and/or dispersants, and then the borohydride particles are suspended in the carrier fluid, as described and exemplified above. The addition of surfactants and/or dispersants to the powder of the borohydride component also improves distribution of the borohydride particles during reaction thereof, which is described further below. If employed, the surfactant and/or the dispersant may be any type known in the art, and are commercially available from a variety of commercial suppliers.

The glycerol component comprises glycerol, which is also referred to in the art as glycerin, glycerine, propane-1,2,3-triol, propane-1,2,3-triol, 1,2,3-propanetriol, 1,2,3-trihydroxypropane, glyceritol, and glycyl alcohol. As understood in the art, glycerol is generally of the simplified formula $C_3H_8(OH)_3$. As shown in the aforementioned formula, the glycerol component has hydroxyl (OH) groups, and the hydroxyl groups have hydrogen atoms in addition to other hydrogen atoms of the glycerol. As understood in the art, glycerol is a polyol, specifically a triol or a trihydroxyl alcohol. Generally, glycerol is a colorless, odorless, sweet-tasting, syrupy liquid that melts at ~17.8° C., and boils with decomposition at ~290° C. Glycerol is generally miscible with water and other polar solvents. Glycerol is present in the form of esters (e.g. glycerides) in many animal and vegetable fats and oils. Glycerol can be obtained commercially as a by-product of animal and vegetable fat and oil hydrolysis. Glycerol can also be synthesized on a commercial scale from propylene produced by petroleum cracking. Recently, glycerol has been obtained as a by-product of biodiesel production, which has favorable economic and environmental benefits, for purposes of the present invention. Due in part to many avenues of production, glycerol is commercially available from a wide variety of commercial suppliers. Further, cost of glycerol is expected to drop with increases in biodiesel production.

The method of the present invention further comprises the step of reacting the borohydride component with the glycerol component. Reaction of the components occurs in the reactor, once the components are contacted. Once the borohydride and glycerol components react, substantially all of the hydrogen atoms present in the borohydride component and substantially all of the hydrogen atoms present in the hydroxyl groups of the glycerol component are converted to form the hydrogen gas. The reaction between the borohydride component and the glycerol is a solvolysis reaction; more specifically the reaction between the borohydride component and the glycerol is an alcoholysis reaction. An example of an alcoholysis reaction between the sodium borohydride (as the borohydride component) and the glycerol is illustrated below by simplified Reaction Scheme II.

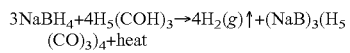

Reaction Scheme II

As illustrated by Reaction Scheme II above, the alcoholysis reaction is generally a spontaneous exothermic reaction of the sodium borohydride and the glycerol component that produces hydrogen gas, heat, and a by-product, i.e., a sodium borate complex $((NaB)_3(H_5(CO)_3)_4)$. In other words, the sodium borate complex is a reaction product of the borohydride component and the glycerol component. The sodium borate complex can be referred to as a metal glycerolate, here as a sodium glycerolate. The reaction product, e.g. the sodium borate complex, can be separated, collected, and sold after forming the hydrogen gas, if so desired. It is important to note that all hydrogen atoms present in the sodium borohydride and all of the hydrogen atoms present in the hydroxyl groups of the glycerol are converted into the hydrogen gas. Specifically, as alluded to above, generally, the alcoholysis reaction of the present invention yields 100% hydrogen from the hydrogen atoms of the borohydride component and the hydrogen atoms of the hydroxyl groups of the glycerol component.

Generally, chemical conversion in the alcoholysis reaction is localized at a phase interface. Specifically, a boundary layer formed at a solid surface of the borohydride particle, e.g. a sodium borohydride particle, consists of a saturated solution of the reaction products, e.g. the sodium borate complex and for a period of time, the hydrogen gas. Limiting factors for the alcoholysis reaction include a diffusion rate of the glycerol component and the size of surface area of borohydride component, as introduced above. Various steps for reducing these limiting factors are further described below.

Theoretical hydrogen storage capacity for the alcoholysis reaction can be calculated based on Reaction Scheme II. In the alcoholysis reaction, the weight of the sodium borohydride is 38 grams/mole, and the weight of the glycerol that reacts with the sodium borohydride is 122 grams (1.33 moles of glycerol per 1 mole of the sodium borohydride), the total reactant weight (i.e., the composition weight) is 160 grams. Since 8 grams (or 4 moles) of hydrogen is released, the theoretical hydrogen storage capacity is calculated as 8 grams over 160 grams, or 5.0% by weight of the composition. To sustain continuous hydrogen formation, three (3) moles of the borohydride component, e.g. sodium borohydride, needs to react with four (4) moles of glycerol, continuously. As such, the composition, prior to reaction, generally includes the borohydride component and the glycerol component in a three (3) to four (4) stoichiometric ratio relative to one another. In certain embodiments, to insure that the borohydride component fully reacts during the alcoholysis reaction, i.e. to insure that the borohydride component is fully "used up", the glycerol component is present in the composition in a stoichiometric excess relative to the borohydride component, prior to reaction. In other embodiments, the borohydride component and the glycerol component may be in other stoichiometric ratios relative to one another, depending on how much hydrogen formation is desired. It is to be appreciated that a similar alcoholysis reaction with the glycerol component can occur with borohydrides other than sodium borohydride, as described and exemplified above, which will yield a different borate complex by-product, i.e., different metal glycerolates, and different amounts of hydrogen based on their respective hydrogen storage capacity. It is also to be appreciated that the borohydride component can include a combination of two or more of the aforementioned borohydrides.

It is believed that the alcoholysis reaction, as illustrated above by Reaction Scheme II, involves two primary steps to form the hydrogen gas. The first step of the two involves protonation of the borohydride component, which is illustrated below by simplified Reaction Scheme III.

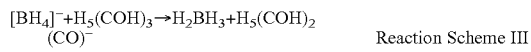
Reaction Scheme III

As illustrated above by Reaction Scheme III, the first step involves protonation of the borohydride component with a proton from the glycerol component. It is believed that in the presence of a strong basic group such as a borohydride anion (i.e., the $[BH_4]^-$ of the borohydride component), the glycerol component behaves as a Lewis acid and can lose protons from its hydroxyl groups. It is further believed that the proton from the glycerol component creates an unstable intermediate (i.e., $BH_2BH_3$).

The second step of the two involves formation of hydrogen, as illustrated below by simplified Reaction Schemes IV and V.

Reaction Scheme IV

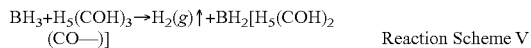
Reaction Scheme V

As illustrated above by Reaction Scheme IV, the unstable intermediate decomposes into a hydrogen molecule and an unstable borohydride (i.e., $BH_3$). This unstable borohydride may further deprotonate another molecule of the glycerol component creating an additional hydrogen molecule and a boron glycerolate complex $(BH_2[H_5(COH)_2(CO-)])$ as illustrated above by Reaction Scheme V.

It is believed that both of the hydrogen forming steps of the second step illustrated above in Reaction Schemes IV and V are fast relative to the first step illustrated in Reaction Scheme III. It is believed that the difference is reaction rate is due predominantly to the presence of the unstable intermediate compounds ($H_2BH_3$ and $BH_3$). As such, the first step is the rate determining step for the overall alcoholysis reaction of the present invention. The practical meaning of the first step is that by changing the rate of this first step, the overall reaction rate of the alcoholysis reaction changes, thereby resulting in different hydrogen generation rates. Various methods of changing the rate of the alcoholysis reaction, i.e., a rate of formation of the hydrogen, are described and illustrated below.

The method can further comprise the step of altering temperature of at least one of the reactor and the composition. In other words, the reactor can have its temperature altered, the composition can have its temperature altered, or both the reactor and the composition can have their temperatures altered. Temperature of the composition may be adjusted by heating or cooling the composition itself, and/or by heating or cooling an individual component (or components) thereof prior to forming and/or during formation of the composition. It is to be appreciated that one or more of the components may be heated and/or one or more of the components may be cooled prior to forming the composition. By altering temperature, the rate of formation of the hydrogen gas can be adjusted. Generally, increasing the temperature increases the rate of formation of hydrogen, while decreasing the temperature decreases the rate of formation of the hydrogen. Heating and cooling can be accomplished by various methods known in the art, such as by the use of one or more heat exchangers. For example, the reactor may include a heat exchanger to control its temperature or a storage vessel containing one of the components, e.g. the glycerol component, can include a heat exchanger. An example of altering temperature (or temperature effect) on the reaction rate of the alcoholysis reaction is illustrated in FIG. 1. FIG. 1 illustrates that the rate of reaction for forming the hydrogen drastically increases with temperature, and is described in further detail below. For example, in the temperature range shown, an increase of only 15° C. (from 24° C. to 39° C.) drastically reduces time required to achieve 100% hydrogen yield from several hours to several minutes.

Viscosity of the composition can also be altered by heating or cooling the composition, as described and exemplified above. Generally, heating the composition decreases viscosity of the composition and cooling the composition increases viscosity of the composition. Typically, increasing the viscosity decreases the rate of formation of the hydrogen and decreasing the viscosity of the composition increases the rate of formation of the hydrogen, by increasing the diffusion rate of the glycerol component. For example, an increase of temperature from 20° C. to 40° C. causes viscosity of the glycerol component to drop by almost a factor of 5 (e.g. dropping from ~1,410 centipoise to ~284 centipoise). Alternatively, the viscosity of the glycerol component can be changed by dilution of the glycerol component. Examples of suitable diluents, for purposes of the present invention, include water and alcohol. However, any other diluent known in the art that has lower or higher viscosity than the glycerol component and is miscible with the glycerol component can be used to modify the viscosity of the glycerol component. In certain embodiments, the method further comprises the step of providing a surfactant component to the reactor thereby altering viscosity of the hydrogen-generating composition. If employed, the surfactant component can comprise any type of surfactant known in the art. As described above, the borohydride component may already include a surfactant to prevent agglomeration of the borohydride particles. Suitable surfactants, for purposes of the present invention, are available from a variety of commercial suppliers.

The method can further comprise the step of altering pressure of the reactor. Pressure can be altered by various methods known in the art, such as by changing flow rates of the components fed to the reactor, changing flow rates of products removed from the reactor, e.g. the hydrogen, or by changing a volume within the reactor. Altering pressure in the reactor is useful for adjusting the rate of formation of the hydrogen. Generally, increasing pressure in the reactor increases the rate of formation of the hydrogen and decreasing pressure in the reactor decrease the rate of formation of the hydrogen.

The method can further comprise the step of providing a pH component to the reactor. The pH component can be provided separate from the borohydride and glycerol components, or included with one of or both of the borohydride and glycerol components. The pH component is useful for adjusting the rate of formation of the hydrogen gas. The pH component can comprise at least one of an acid, a base, and a buffer. The acid, base, or buffer can comprise any acid, base, or buffer known in the art. Generally, the acid, base, or buffer respectively increases, decreases, or maintains the rate of formation of the hydrogen gas. Suitable acids, bases, and buffers, for purposes of the present invention, are available from a variety of commercial suppliers.

In one embodiment, the pH component comprises acetic acid, which can be concentrated or diluted, e.g. 5% by weight acetic acid in water. This embodiment useful for increasing the rate of formation of the hydrogen gas. Typically, the borohydride component will react with the acid, if employed as the pH component. In such a reaction, generally hydrogen gas and triacetoxyborohydride ($NaBH(CH_3COO)_3$) are formed (when sodium borohydride is employed as the borohydride component). Such a reaction between the borohydride component, e.g. sodium borohydride, and the acid is also generally highly exothermic. As such, heat generated during such the exothermic reaction can be used to trigger the alcoholysis reaction since the reaction rate of the alcoholysis reaction can be suppressed or enhanced by changing temperature, as described and exemplified above. If employed, the pH component can be used in various amounts, based on how much the rate of formation of hydrogen is desired to be changed. As such, suitable amounts of the pH component and corresponding rates of reaction can be determined via routine experimentation by one skilled in the art.

The method can further comprise the step of providing a catalyst component to the reactor. The catalyst component can be provided separate from the borohydride and glycerol components, or included with one of or both of the borohydride and glycerol components. The catalyst component is useful for adjusting the rate of formation of the hydrogen gas, typically, if employed, for increasing the rate of formation of the hydrogen gas. It is believed that the catalyst component facilitates heterogeneous catalysis of the alcoholysis reaction. The catalyst component can comprise one or more conventional catalysts known in the art. Suitable grades of catalyst, for purposes of the present invention, are available from a variety of commercial suppliers.

If employed, the catalyst component is typically a solid catalyst. The catalyst component can be in various forms, such as a finely dispersed powder, pellets, or particles. These forms of the catalyst component can be suspended in the glycerol component (i.e., the glycerol component serves as a carrier fluid). The catalyst component is typically selected from the group of carbon-based catalysts, platinum-based catalysts, palladium-based catalysts, ruthenium-based catalysts, titania-based catalysts, and combinations thereof. In one embodiment, the catalyst component comprises activated carbon. This embodiment useful for increasing the rate of formation of the hydrogen gas. Further, activated carbon is generally inexpensive, bio-derived, and bio-degradable. Specifically, low catalyst cost and preparation from renewable sources allows for discarding of the activated carbon along with the reaction by-product or recycling of the activated carbon by filtration, washing and drying. If employed, the catalyst component can be used in various amounts, based on how much the rate of formation of the hydrogen is desired to be changed. As such, suitable amounts of the catalyst component and corresponding rates of reaction can be determined via routine experimentation by one skilled in the art.

The method can further comprise the step of recycling the carrier fluid (if employed, as previously described and exemplified with description of the borohydride component) from the reactor after the step of reacting the borohydride component with the glycerol component. This step is useful for incorporating additional borohydride particles into the recycled carrier fluid. As such, the "recharged" and recycled carrier fluid can be subsequently used for providing additional amounts of the borohydride component to the reactor for further formation of hydrogen. A semi-batch reaction system employing such a step is described below.

In certain embodiments, the method further comprises the step of providing water to the reactor. The water is useful for diluting the hydrogen-generating composition. Further, the water can also react with the borohydride component to form hydrogen; however, such a reaction is generally disfavored due to issues with increase in pH and fouling of the catalyst component, as described above. As such, in certain embodiments, the composition is substantially free of water. In these embodiments, the composition typically includes water in an amount of less than 50, more typically less than about 25, yet more typically less than about 15, most typically less than about 5, and yet most typically equaling or approaching about 0, parts by weight, based on 100 parts by weight of the composition. It is to be appreciated that one or more of the components may include trace amounts of water. In one embodiment, the composition is completely free of water, i.e., the composition is anhydrous.

The method can further comprise the step of mixing the composition contemporaneously with the step of reacting of the borohydride component with the glycerol component. This step of mixing is useful for increasing a rate of formation of the hydrogen gas. Specifically, the diffusion limitations of the alcoholysis reaction can be reduced through mixing, stirring, or physical manipulation of the composition such that convective mass transport becomes a dominating flow effect. Generally, mixing greatly enhances the rate of reaction of the glycerol component with the borohydride component. Mixing of the composition can be accomplished in various ways, such as by a mixing blade disposed in the reactor or by some other form of agitation known in the art. For example, the components can be mixed via spraying when being introduced into the reactor. Further, mixing can be achieved not only through external means, e.g. a mixing blade, but also by taking advantage of temperature generation to promote natural convection of the composition within the reactor.

Generally, the method further comprises the step of removing the hydrogen gas from the reactor after (and/or during) formation of the hydrogen gas. Also, the method generally comprises the step of storing the hydrogen gas removed from the reactor. The hydrogen gas can be stored in a storage vessel or stored directly in an end product, such as a hydrogen fuel cell.

As introduced above, various types of reactors, and therefore various types of reactor systems can be employed to employ the present invention. In one embodiment, the reactor is a batch reactor. In this embodiment, as introduced above, stoichiometric quantities of the components of the alcoholysis reaction are provided to the reactor at the same time to form the composition. Batch reactors allow for the alcoholysis reaction to be completed, albeit at a decreasing rate in time.

Figure 2:
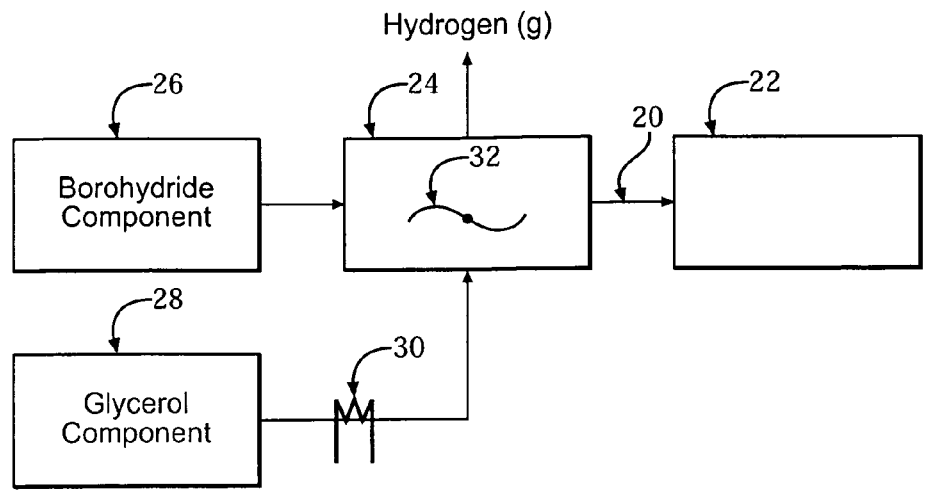
FIG. 2 depicts an embodiment of a simplified batch reactor system employing the method of the present invention including a borohydride component and a glycerol component.

Referring to the Figures, a simplified batch reaction system is shown in FIG. 2, wherein like numerals indicate like or corresponding parts throughout the several Figures. In this system, reaction by-products 20, e.g. the sodium borate complex, are removed into a storage vessel 22 before new reactants (i.e., new components of the composition) are introduced to a reaction chamber 24 from respective storage vessels 26, 28 for the borohydride component and the glycerol component. The reaction chamber 24 can be pressurized or not. Timing for introducing new reactants is dependent on the minimum desired rate of hydrogen formation of the alcoholysis reaction in the reaction chamber 24. This minimum rate can occur before the complete reaction of the composition has occurred in the reaction chamber 24. Therefore, some of the composition may end up in the storage vessel 22, where the composition will continue to react and form hydrogen. In this way, the alcoholysis reaction is completed and the reaction rate can be controlled in a repeatable manner.

In this system, the storage vessel 26 for the borohydride component, e.g. sodium borohydride, can be pressurized or not. The borohydride component is typically dispersed in the carrier fluid (such as in a solution, an emulsion or a suspension) such that the borohydride component is flowable or conveyable. The storage vessel 28 for the glycerol component can be pressurized or not. The glycerol component is generally in a flowable or conveyable state. Both of the components are provided, i.e., introduced into the reaction chamber 24 either contemporaneously and/or introduced into the reaction chamber 24 one before the other. The glycerol component may pass or may be subjected to heat through an optional heater 30 (i.e., a heat exchanger 30). As described and exemplified above, the heater 30 can be used to alter the temperature and the viscosity of the glycerol component as a way to change the rate of hydrogen formation from the alcoholysis reaction. The reaction chamber 24 allows for the alcoholysis reaction to proceed in such a way as to let the hydrogen escape for storage or conveying to an end product or to be retained, for example, in head-space of the reaction chamber 24. For example, the hydrogen can be stored in a vessel or sent directly to an end product, such a hydrogen fuel cell. The alcoholysis reaction in the reaction chamber 24 may optionally be promoted using a mixer 32, which is any device that agitates, vibrates or physically disturbs the composition during the alcoholysis reaction, e.g. a mixing blade 32. As the alcoholysis reaction occurs or when the alcoholysis reaction has finished, the by-products 20 of the alcoholysis reaction are removed from the reaction chamber 24, using any conventional conveying or pumping method, and stored in the storage vessel 22. In this embodiment, the by-products 20 are generally removed from the reaction chamber 24 in order to prevent the by-products 20 from influencing the next alcoholysis reaction performed in the reaction chamber 24.

Figure 3:
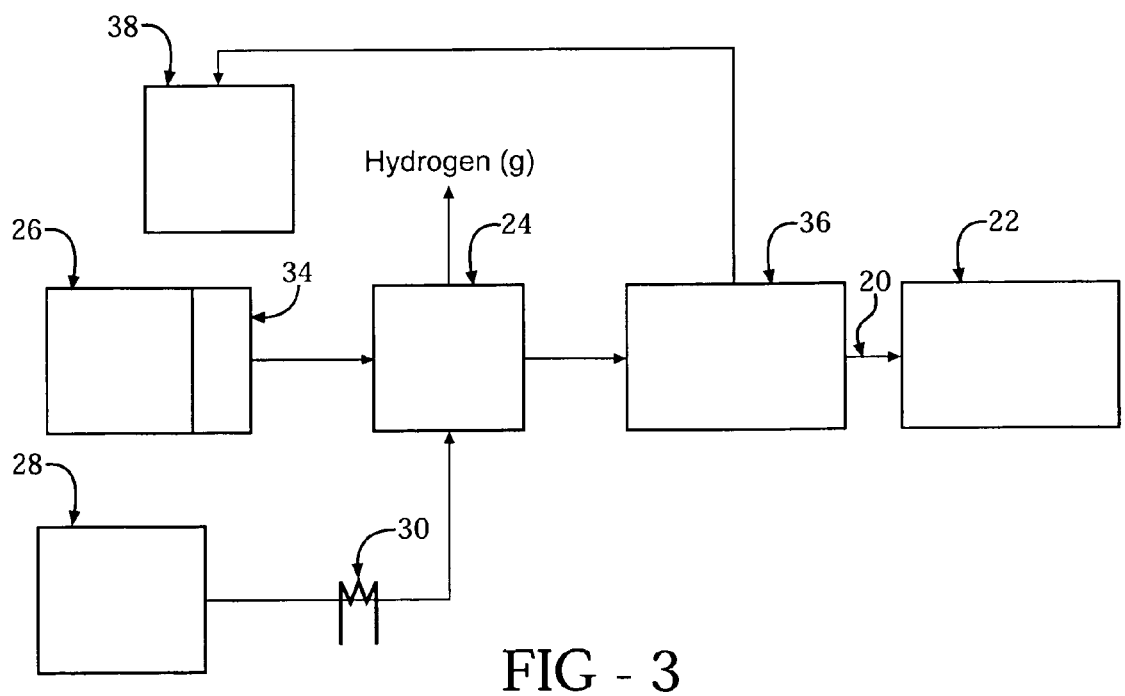
FIG. 3 depicts an embodiment of a simplified semi-batch reactor system employing the method of the present invention including a recycle loop for recovering a carrier fluid used in the borohydride component.

In one embodiment, the carrier fluid used for carrying the borohydride component can be recycled, as first introduced above. As shown in FIG. 3, the carrier fluid used to convey the borohydride component from the storage vessel 26 into the reaction chamber 24 can be separated from the by-products 20 and reused to convey additional amounts of the borohydride component to the reaction chamber 24. FIG. 3 illustrates a simplified batch reactor system similar to the system illustrated in FIG. 2; however, this system is different in that the borohydride component is conveyed from the storage vessel 26 to the reaction chamber 24 using a carrier fluid that has been recycled. In this case, the borohydride component includes the carrier fluid, e.g. mineral oil, which is made in a mixing area 34 of the storage vessel 26. The carrier fluid now including the borohydride component is then provided to the reaction chamber 24 for the alcoholysis reaction with the glycerol component. The by-products 20 of the alcoholysis reaction along with the carrier fluid are separated from each other using a fluid separating device 36, e.g. a dephlegmator 36. After separation, the separated (recovered/recycled) carrier fluid is pumped into a storage vessel 38 while the by-products 20 are pumped to the storage vessel 22. The storage vessel 38 can then feed the mixing area 34 to repeat the process.

In another embodiment, the reactor is a semi-batch reactor. In this embodiment, generally, the whole amount of the glycerol component is stored in the reactor and a stoichiometric quantity of the borohydride component is metered to the reactor to form the composition and hydrogen gas formed therefrom. In one embodiment, the reaction system can also operate as a batch reactor but without removal of the by-products 20. In this case, the rate of formation of hydrogen will decrease as the borohydride component is consumed and the hydrogen and the by-products 20 are formed via the alcoholysis reaction.

Figure 4:
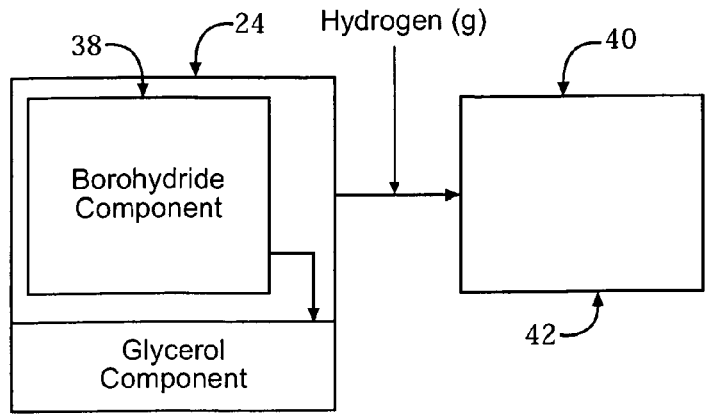
FIG. 4 depicts another embodiment of the a simplified semi-batch reactor system employing the method of the present invention including components of a composition used in the method initially kept separate from one another and where by-products are not removed form the system but the hydrogen is conveyed out of a reaction chamber.

FIG. 4 illustrates an example of such a simplified semi-batch system. Here, the by-products 20 are not removed from the reaction chamber 24. In this system, the borohydride component is packaged 38 inside the reaction chamber 24 in such a way as to not react with the glycerol component, until so desired. When hydrogen formation is demanded, e.g. almost instantaneously, the borohydride component is dispensed from the package 38 (using any type of unpacking mechanism (not shown)) such that the borohydride component drops or comes in contact with the glycerol component to initiate the alcoholysis reaction. The hydrogen formed from the alcoholysis reaction is stored in or allowed to escape from the reaction chamber 24. As described above, the hydrogen can be fed to a storage vessel (not shown), a hydrogen fuel cell 40, e.g. an open cathode convective polymer electrolyte membrane (PEM) fuel cell 40, a metal hydride canister 42 for storage, or any other device that requires hydrogen (not shown).

Figure 5:
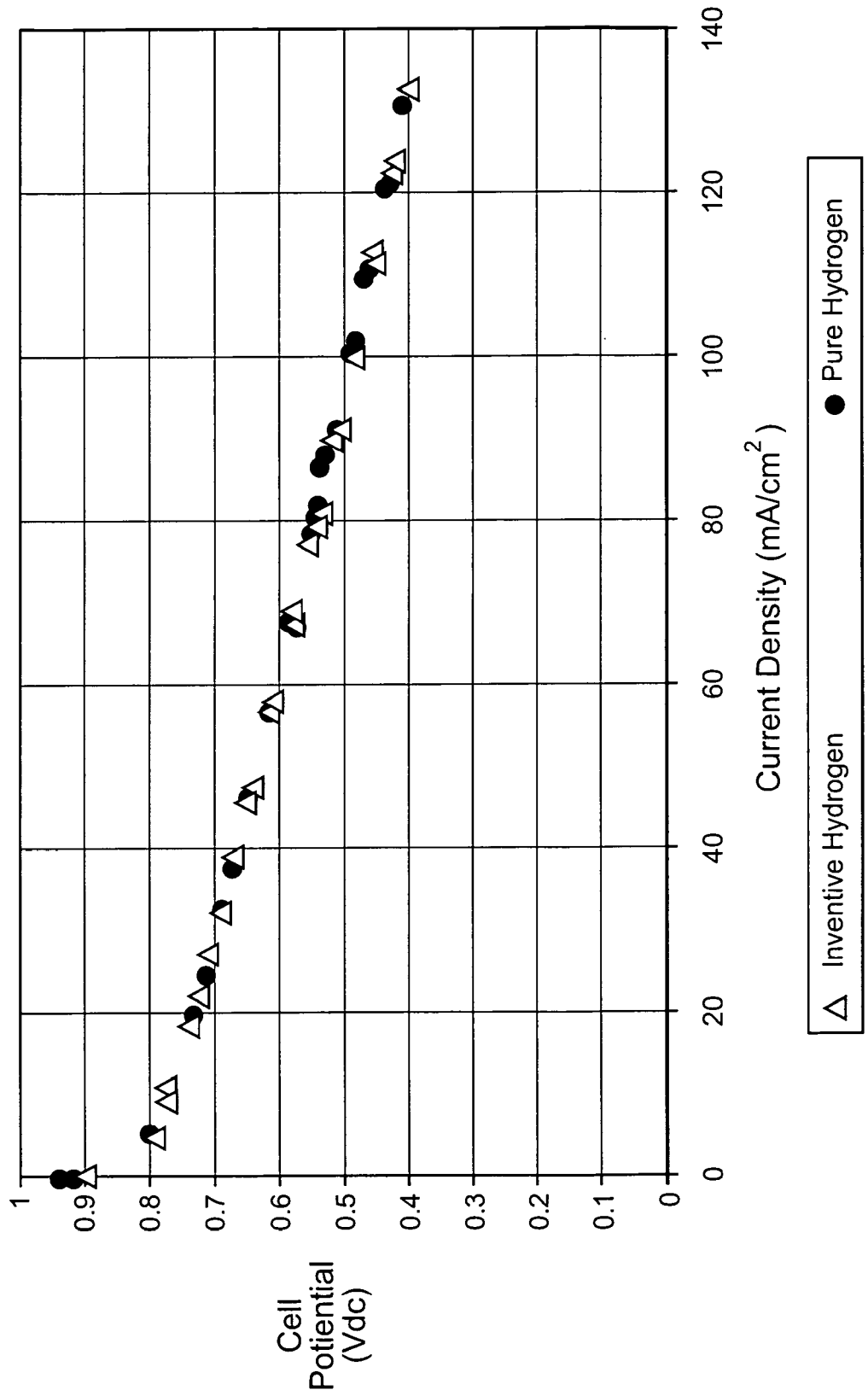
FIG. 5 is a graph illustrating a polarization curve of a convective PEM fuel cell fueled by hydrogen formed from the method of the present invention compared against a convective PEM fuel cell fueled by research grade hydrogen (pure hydrogen)

To illustrate purity and quality of the hydrogen formed via the present invention, FIG. 5 illustrates a polarization curve, or electrochemical performance, of the open cathode convective PEM fuel cell 40 fueled with a system as shown in FIG. 4. FIG. 5 also illustrates performance of an open cathode convective PEM fuel cell fueled with research grade hydrogen from a bottle. With reference to FIG. 5, no significant difference in performance was discernable between the fuel cell 40 fueled by the method of the present invention as described in this embodiment and the fuel cell fueled by research grade hydrogen.

Figure 6:
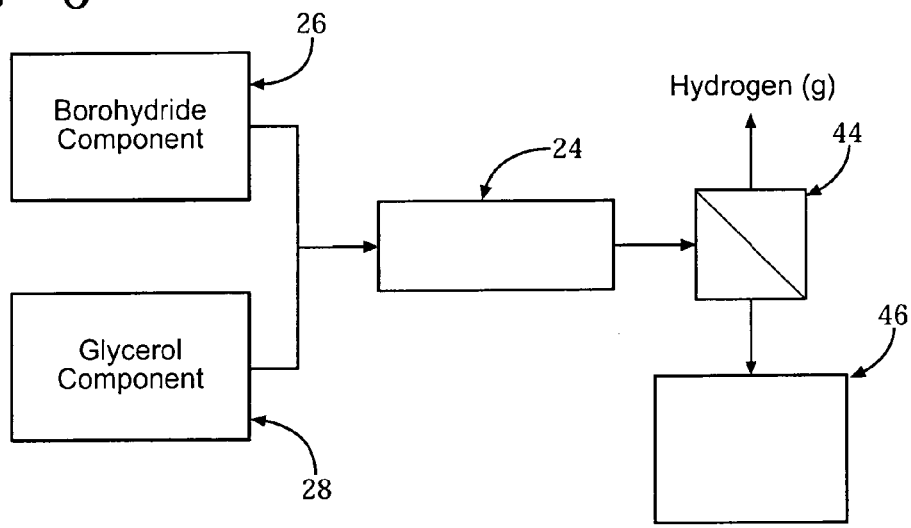
FIG. 6 depicts an embodiment of a simplified continuous-flow reactor system employing the method of the present invention including a separator and a catalyst bed.

In yet another embodiment, the reactor is a continuous-flow reactor. In this embodiment, the components of the alcoholysis reaction are provided continuously to the reactor to continuously produce the hydrogen. For example, to obtain greater control of the rate of formation of the hydrogen, a continuous-flow reactor simplified system as shown in FIG. 6 can be employed. In such a system, the borohydride component can be stabilized and fluidized by using a basic water solution, more typically stabilized and fluidized by using the carrier fluid, e.g. petroleum jelly or mineral oil. The borohydride component is introduced into the reaction chamber 24 along with the glycerol component. In this embodiment, the alcoholysis reaction generally only occurs in the presence of the catalyst component (which is disposed in a catalyst bed (not shown) within the reaction chamber 24). Therefore, the rate of formation of the hydrogen is generally given by the space velocity of the composition through it, more specifically the space velocity of the components of the composition through the reaction chamber 24. The addition of the glycerol component significantly enhances the rate of formation of the hydrogen formed from the borohydride component, as illustrated in FIG. 6. This enhancement results in a reduction of the component space velocities required to attain a desired hydrogen formation rate. The implications of this are that the volume of reaction chamber 24 and the catalyst bed can be reduced. Therefore, footprint of the system can be reduced, which reduces cost of the system.

In FIG. 6 a continuous hydrogen formation system using a catalyst bed is shown. In this case, the borohydride component is stabilized using a base or by eliminating its contact with water (i.e., the borohydride component is anhydrous), but is still in liquid or flowable form (e.g. via use of the carrier fluid). The borohydride component is mixed with the glycerol component inside the reaction chamber 24, which contains the catalyst component (as described and exemplified above). The reaction products (e.g. hydrogen, unreacted components, the carrier fluid, and/or the by-products 20) are separated using a hydrogen filter 44. The unreacted components, the carrier fluid, and/or the by-products 20 can be stored in a storage vessel 46.

Figure 7:
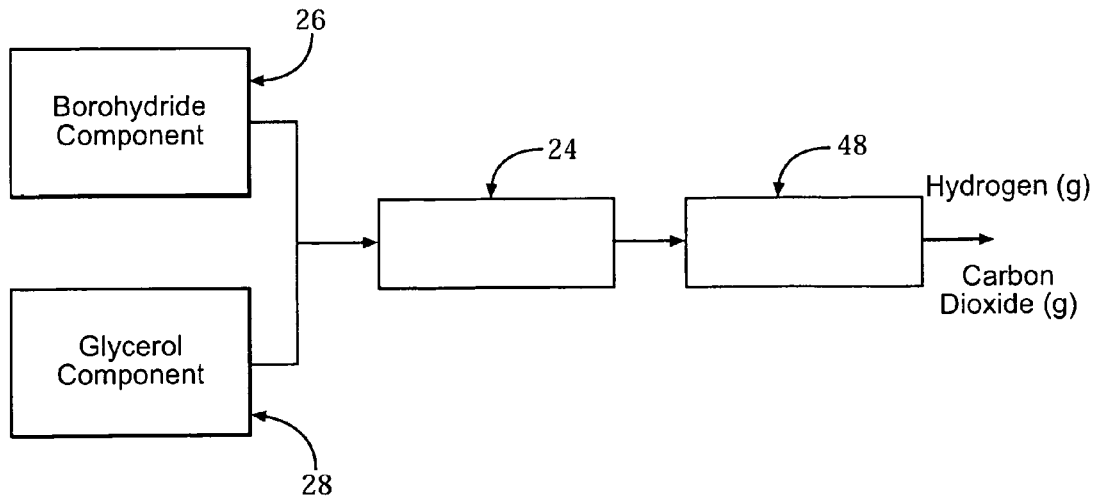
FIG. 7 depicts another embodiment of a simplified continuous-flow reactor system employing the method of the present including a steam reformer for applying heat and for promoting hydrogen formation.

In certain embodiments, the reactor system includes a steam reformer for increasing a rate of formation of the hydrogen gas. The steam reformer can be any steam reformer known in the art, such as a hydrocarbon or carbohydrate steam reformer. As alluded to above, since the alcoholysis reaction is exothermic, the heat generated from the alcoholysis reaction can be used to promote and maintain an endothermic steam reforming reaction of hydrocarbons and carbohydrates, which could include the glycerol component itself or the by-product of the alcoholysis reaction. If the glycerol component itself is reformed, the maximum theoretical hydrogen weight percent would be 10 wt %. The following paragraph is a detailed description of such a system. An example of a system employing the steam reformer is illustrated in FIG. 7. In this case, the borohydride component in a fluidized and stabilized state is introduced into the reaction chamber 24 (having the catalyst component) along with the glycerol component. In one embodiment, the glycerol component includes water. The composition is allowed to alcoholysis react within the reaction chamber 24 producing heat and hydrogen. The component amounts are introduced such that enough heat is generated to vaporize and superheat any leftover components and by-products. Gases formed in the reaction chamber 24 are introduced into a fuel reformer catalyst bed 48 (which could be the same as where the alcoholysis reaction takes place), where an endothermic glycerol steam reforming reaction is believed to occur, which forms primarily hydrogen and carbon dioxide. Such a reforming reaction is illustrated below by simplified Reaction Scheme VI.

$C_3H_5(OH)_3 + H_2O \rightarrow 3CO_2 + 7H_2$     Reaction Scheme VI This system would yield a theoretical maximum of 10 wt % hydrogen. It is believed that the by-product of alcoholysis reaction, e.g. sodium borate complex, can be recycled back to the borohydride component as illustrated below by simplified Reaction Scheme VII.

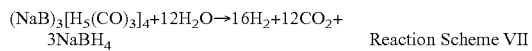
$(NaB)_3[H_5(CO)_3]_4 + 12H_2O \rightarrow 16H_2 + 12CO_2 + 3NaBH_4$     Reaction Scheme VII Reforming reaction of sodium borate complex is also possible as illustrated below by simplified Reaction Scheme VIII.

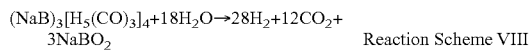
$(NaB)_3[H_5(CO)_3]_4 + 18H_2O \rightarrow 28H_2 + 12CO_2 + 3NaBO_2$     Reaction Scheme VIII The following examples, illustrating the method of the present invention, are intended to illustrate and not to limit the invention.

EXAMPLES

Reaction Comparison Example

Figure 8:
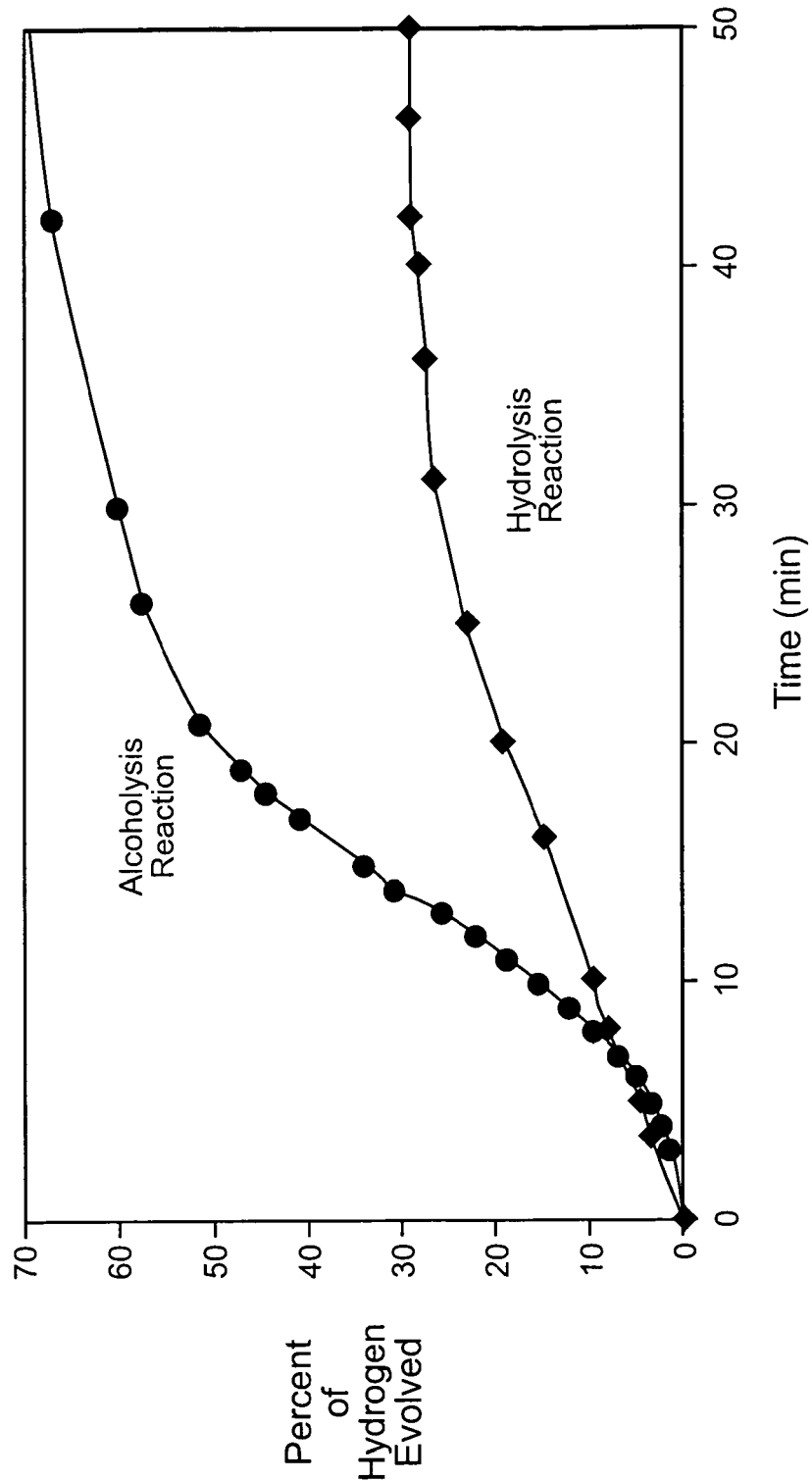
FIG. 8 is a graph illustrating hydrogen formation over time for the method of the present invention (alcoholysis reaction) compared against a conventional method (hydrolysis reaction)

A simplified batch reactor system is employed to compare the alcoholysis reaction of the present invention against a conventional hydrolysis reaction. For the alcoholysis reaction, the system includes a borohydride component container, a glycerol component container, and a reaction chamber. For the hydrolysis reaction, the system is the same as above, except the glycerol component container is replaced with a water container. Hydrogen formation for each of the reactions is illustrated in FIG. 8, where the percent of hydrogen evolved in the respective reactions at room temperature are compared. For this comparison, sodium borohydride is used as the borohydride component. For this system, 1 wt % sodium borohydride with glycerol and with water at room temperature is used to form the hydrogen.

Figure 9:
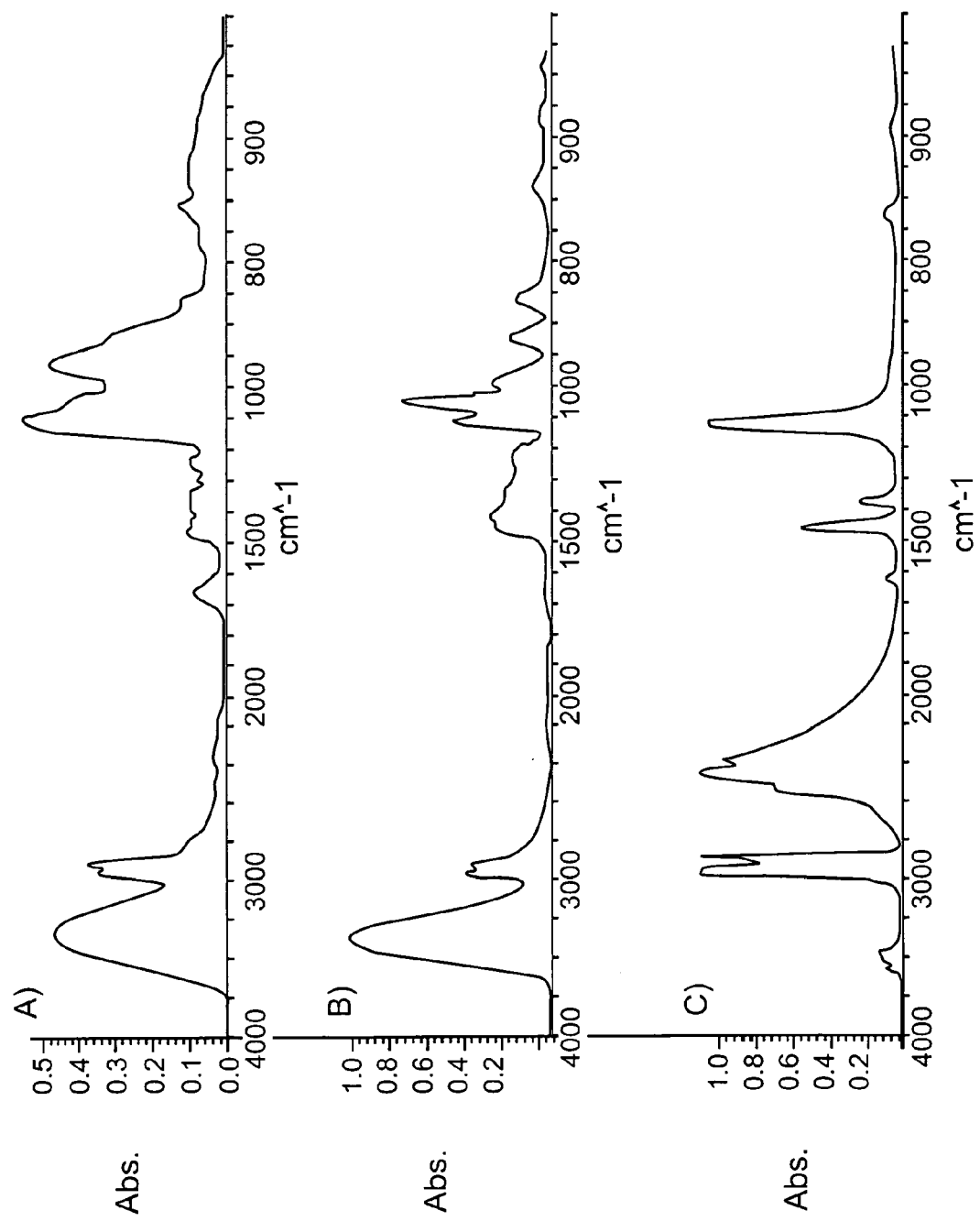
FIG. 9 is a graph illustrating IR spectroscopy information for various components and by-products employed in and formed from the method of the present invention.

Spectroscopy Analysis:

To test by-products formed by the alcoholysis reaction, infra-red (IR) spectroscopy is performed. When the composition employs sodium borohydride and glycerol, the by-product of the alcoholysis reaction is sodium borate complex (as described above), which has a molecular structure of boron glycerolate alkoxide (as confirmed with the IR spectroscopy. IR spectrums of various components and by-products are shown in FIG. 9. Specifically, FIG. 9 is the infrared spectrum of A) sodium boron glycerolate; B) glycerol; and C) sodium borohydride in mineral oil (as the carrier fluid).

Referring to the IR spectrum, it is believed that the different coordination modes of glycerol molecules due to the presence of new bonds with boron led to changes within the main fingerprint spectral region (1500-400 $cm^{-1}$) relative to those in pure glycerol. The C—OH bend centered at 1331 $cm^{-1}$ in glycerol is shifted to higher frequency in the boron glycerolate spectrum centered at 1350 $cm^{-1}$. The absorption band shows also increased complexity caused by band splitting and appearance of new bands assigned to spatial/mechanical interactions of adjacent molecular groups. The glycerol C—O vibration frequencies located at 1109 and 1034 $cm^{-1}$ broadened and shifted to lower frequencies 1097 and 1029 $cm^{-1}$, respectively. A new intense peak appeared in the product spectrum at 980 $cm^{-1}$ that is indicative of the alkoxide bond (C—O—B). It is valuable to mention that a B—H vibration band centered at 2330 $cm^{-1}$ in the IR spectrum of a sodium borohydride sample was not detected, meaning that the whole amount of the sodium borohydride reacted with the glycerol component.

Examples

Figure 10:
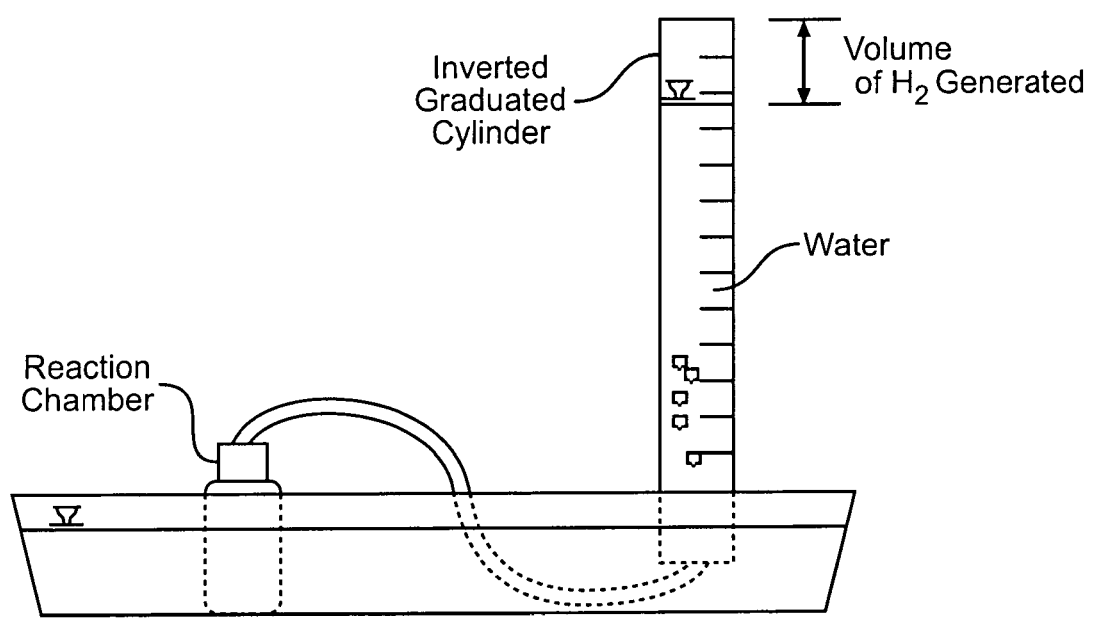
FIG. 10 depicts a simplified experimental system used for creating and testing examples of the method of the present invention for forming hydrogen gas and for creating and testing conventional methods of forming hydrogen gas, the system allowing for quantification of the rate and amount of hydrogen formation.

Experiments designed to perform the alcoholysis reactions were conducted using an experimental system is generally shown in FIG. 10. The experimental system consisted of a 75 mL plastic reaction chamber with a cap connected to a ¼ inch tube. The tube was directed into an inverted 500 mL graduated cylinder filled with water and partially submerged in a water tank. The volume of hydrogen gas produced during the alcoholysis reaction was measured as the volume of water displaced in the graduated cylinder. The time and volume of the hydrogen gas produced as the alcoholysis reactions occurred were recorded in the experiments described below.

Example I

Alcoholysis Reactions with Temperature Changes

The experimental system was used in this example. Twenty grams of glycerol was measured and placed in the reaction chamber. The glycerol was equilibrated at reaction temperature for 30 minutes in a temperature controlled water bath and then 0.2 g of sodium borohydride powder was added to the reaction chamber. The hydrogen formation rate was tested at five different temperatures in a temperature range of from 24.0° C. to 39.0° C. The results are illustrated in FIG. 1, which is a graph that shows the hydrogen mass in grams generated per one (1) gram of sodium borohydride vs. time in minutes at the different alcoholysis reaction temperatures. As can be seen with reference to FIG. 1, the effect of temperature on the alcoholysis reaction, time to complete the alcoholysis reaction and to generate the theoretical maximum of hydrogen amount contained in the composition deceased from ~150 minutes at room temperature to ~10 minutes at 39° C. Therefore, it has been shown that temperature can be used to control the hydrogen release rate in the alcoholysis reaction of the present invention.

Example II

Alcoholysis Reactions with Addition of a Diluted Acid

Figure 11:
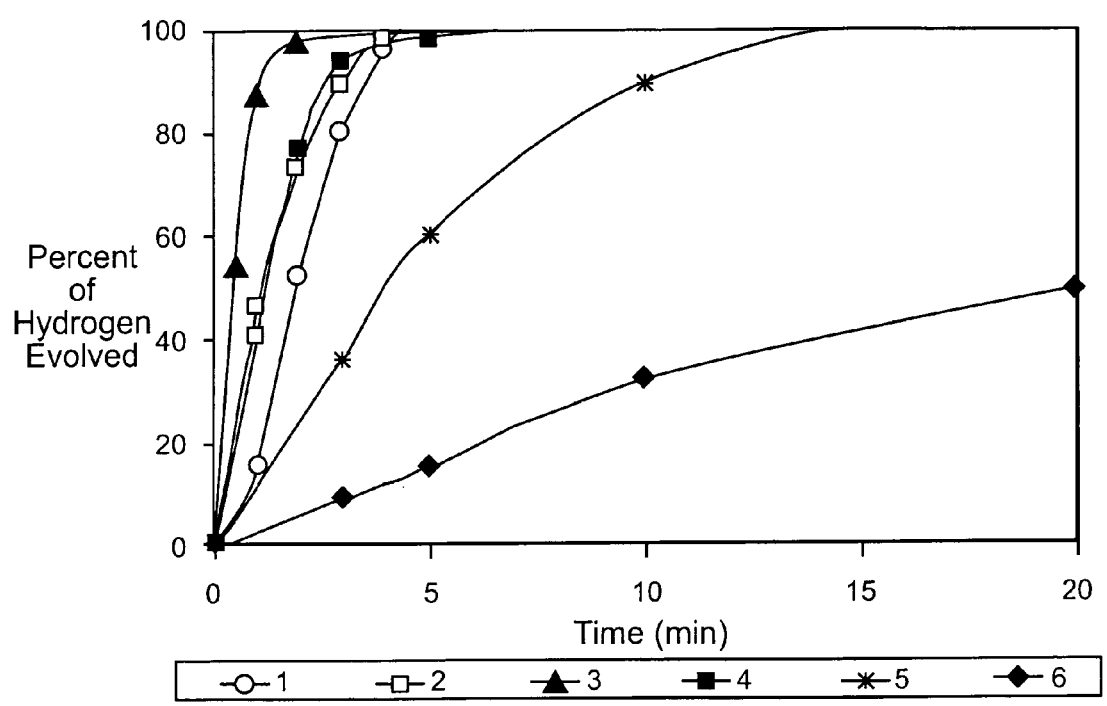
FIG. 11 is a graph of various rates of hydrogen formation using a semi-batch reaction system.

The experimental system was also used in this example. The alcoholysis reaction procedure for generating hydrogen was carried out at room temperature at non-isothermal conditions. In this example, 3.7405 grams of glycerol was weighted and placed into the reaction chamber. Six pellets (~0.2 g each) made of compressed sodium borohydride powder were successively added into the reaction chamber once the total amount of hydrogen was released from each pellet. At the same time when each individual pellet was placed into the reaction chamber, 0.2 mL of 5 wt % acetic acid in water solution was injected into the reaction chamber with a syringe. The results are illustrated in FIG. 11, in which a graph of the hydrogen mass in grams per 1 gram of sodium borohydride generated as a function of time is shown. Specifically, FIG. 11 illustrates semi-batch reactions of sodium borohydride and glycerol. Each plot shows the percent of hydrogen evolved versus time during the reactions of individual sodium borohydride pellets added into the reaction chamber with glycerol. The reactions of the first five pellets have completed within 15 minutes. The reaction of the sixth pellet is slowed down by the presence of by-product and by depletion of the glycerol. As shown in the graph, hydrogen release rate increased in the presence of the acetic acid. The alcoholysis reaction of the sodium borohydride and the glycerol completes much faster in the presence of the acetic acid (the pH component) than without it.

Example III

Alcoholysis Reaction with Mixing

The experimental system was also used in this example. Sodium borohydride powder was mixed with petroleum jelly (the carrier fluid) in a weight ratio of 2:1.5 to get a homogeneous paste, which serves as the borohydride component. The same paste amounts that contained 0.212 g sodium borohydride were used for two experiments to evaluate the effects of mixing on the alcoholysis reaction rate. The glycerol component (liquid) included 0.7 g of glycerol, 0.076 g of acetic acid, and of 0.324 g water. The experiments were conducted at room temperature. The homogenous paste (the borohydride component) was metered and placed first into the reaction chamber, and then the glycerol component was added to the reaction chamber by syringe. In one experiment the reaction mixture was stirred with a magnetic stirrer to the end of the alcoholysis reaction. In the second experiment, mixing was not used. The hydrogen generation rates were 109 mL/min and 36 mL/min for the stirred and not stirred compositions, respectively.

Example IV

Alcoholysis Reactions with Water and Catalyst Component

Figure 12:
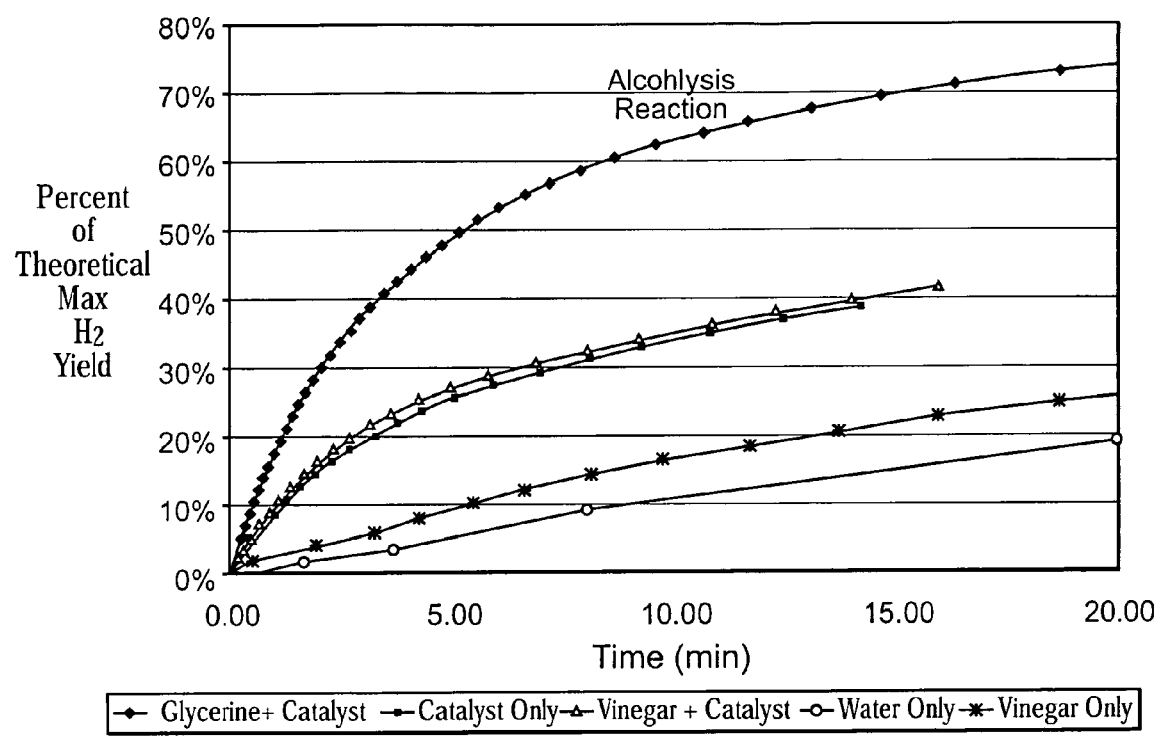
FIG. 12 is a graph of various rates of hydrogen for using various compositions.

The experimental system was also used in this example. Different combinations of the components of the composition including 0.6 g of glycerol (termed stoichiometric glycerol), 0.2 g of 5 wt % acetic acid (termed stoichiometric vinegar), and 1 g of activated carbon were reacted with 0.2 g of sodium borohydride. Water was added to the balance of 20 g. The resultant hydrogen evolution from these reactions is shown in FIG. 12 is the resultant hydrogen volume generated from the sodium borohydride reaction with water (i.e., a conventional hydrolysis reaction) and activated charcoal (as the catalyst component); water and glycerol; water and acetic acid; and water, glycerol and catalyst. Note that the addition of activated carbon increased the reaction rate of the alcoholysis reaction. This increase was higher than that exhibited by use of the water and acid. This demonstrates that hydrogen generation devices using the alcoholysis reaction of the present invention, can be enhanced with the addition of an inexpensive, bio-derived and bio-degradable catalyst (e.g. activated carbon as the catalyst component).

Example V

Alcoholysis Reactions with Varying Glycerol Concentrations

Figure 13:
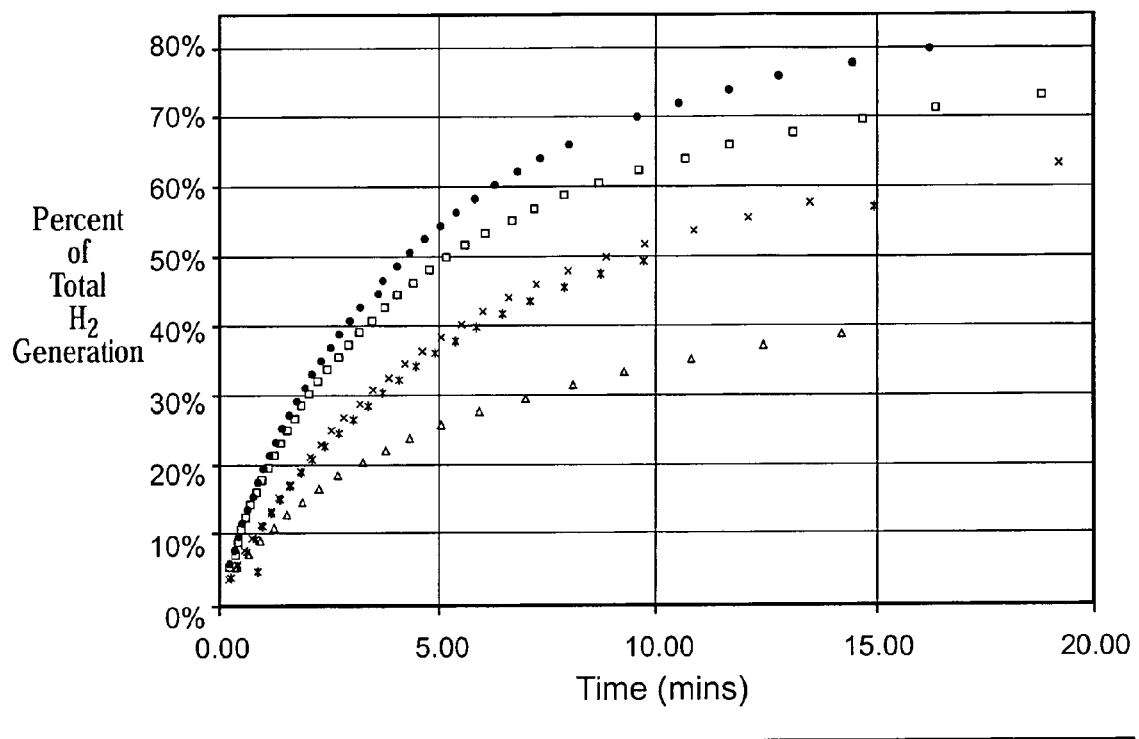
FIG. 13 is a graph of various rates of hydrogen formation using various concentrations of glycerol.

The experimental system was also used in this example. In these experiments, 0.2 g of sodium borohydride, with 20 mL of water, in the presence of one (1) gram of activated carbon granules (the catalyst component), with different amounts of glycerol, were reacted. The glycerol was added in fractions of its stoichiometric quantity (0.6 g), and mixed with the water and the activated carbon before it was added into reaction chamber (which held the sodium borohydride). It was observed that adding more glycerol resulted in a dramatic change of the hydrogen generation rate. These results are illustrated in FIG. 13. Specifically, FIG. 13 illustrates the effect of glycerol concentration on the alcoholysis reaction of sodium borohydride diluted in water with activated charcoal as the catalyst component.

The present invention has been described herein in an illustrative manner, and it is to be understood that the terminology which has been used is intended to be in the nature of words of description rather than of limitation. Many modifications and variations of the present invention are possible in light of the above teachings. The invention may be practiced otherwise than as specifically described within the scope of the appended claims.

What is claimed is:

1. A method of forming hydrogen gas, said method comprising the steps of:
providing a reactor;
providing a hydrogen-generating composition to said reactor, said hydrogen-generating composition consisting essentially of a borohydride component and a glycerol component in a stoichiometric ratio of generally three to at least four, said borohydride component having hydrogen atoms and said glycerol component having hydroxyl groups with hydrogen atoms; and
directly reacting said borohydride component with said glycerol component in an alcoholysis reaction thereby converting substantially all of said hydrogen atoms present in said borohydride component and substantially all of said hydrogen atoms present in said hydroxyl groups of said glycerol component to form the hydrogen gas, the alcoholysis reaction starting at a temperature of less than about 39 degrees Celsius.

2. A method as set forth in claim 1 wherein said borohydride component comprises sodium borohydride ($NaBH_4$).

3. A method as set forth in claim 2 wherein said hydrogen-generating composition is substantially free of water.

4. A method as set forth in claim 1 wherein said hydrogen-generating composition is substantially free of water.

5. A method as set forth in claim 1 wherein said borohydride component is selected from the group consisting of sodium borohydride ($NaBH_4$), lithium borohydride ($LiBH_4$), potassium borohydride ($KBH_4$), rubidium borohydride ($RbBH_4$), and combinations thereof.

6. A method as set forth in claim 5 wherein said hydrogen-generating composition is substantially free of water.

7. A method as set forth in claim 1 further comprising the step of mixing said hydrogen-generating composition contemporaneously with said step of reacting of said borohydride component with said glycerol component thereby increasing a rate of formation of the hydrogen gas.

8. A method as set forth in claim 1 further comprising the step of altering temperature of at least one member selected from the group consisting of said reactor and said hydrogen-generating composition, thereby adjusting a rate of formation of the hydrogen gas.

9. A method as set forth in claim 1 further comprising the step of altering pressure of said reactor thereby adjusting a rate of formation of the hydrogen gas.

10. A method as set forth in claim 1 further comprising the step of providing a pH component to said reactor thereby adjusting a rate of formation of the hydrogen gas.

11. A method as set forth in claim 10 wherein said pH component comprises an acid thereby increasing the rate of formation of the hydrogen gas.

12. A method as set forth in claim 1 further comprising the step of providing a catalyst component to said reactor thereby increasing a rate of formation of the hydrogen gas.

13. A method as set forth in claim 12 wherein said catalyst component is selected from the group consisting of carbon-based catalysts, platinum-based catalysts, palladium-based catalysts, ruthenium-based catalysts, titania-based catalysts, and combinations thereof.

14. A method as set forth in claim 1 wherein said glycerol component is present in said hydrogen-generating composition in a stoichiometric excess relative to said borohydride component.

15. A method as set forth in claim 1 wherein said borohydride component comprises borohydride powder having particles with an average particle diameter of less than about 300 micrometers.

16. A method as set forth in claim 15 wherein said borohydride component further comprises a carrier fluid and said borohydride particles are suspended in said carrier fluid.

17. A method as set forth in claim 16 further comprising the step of recycling said carrier fluid from said reactor after the step of reacting said borohydride component with said glycerol component for incorporating additional borohydride particles in said carrier fluid for subsequently providing said borohydride component to said reactor.

18. A method as set forth in claim 16 wherein said carrier fluid is selected from the group consisting of mineral oil, petroleum jelly, saturated vegetable, plant, and animal oils and fats, non-saturated vegetable, plant, and animal oils and fats, and combinations thereof.

19. A method as set forth in claim 1 wherein said reactor is selected from the group consisting of a batch reactor, a semi-batch reactor, and a continuous-flow reactor.

20. A method as set forth in claim 1 wherein said reactor includes a catalyst bed for increasing a rate of formation of the hydrogen gas.

21. A method as set forth in claim 1 wherein said reactor includes a glycerol steam reformer for at least one of increasing a rate of formation of the hydrogen gas and generating hydrogen in addition to the hydrogen produced in the alcoholysis reaction.

22. A method as set forth in claim 1 further comprising the steps of removing the hydrogen gas from said reactor after formation and storing the hydrogen gas removed from said reactor in a storage vessel.

23. A method as set forth in claim 1 further comprising the step of providing water to said reactor thereby diluting said hydrogen-generating composition.

24. A method as set forth in claim 1 further comprising the step of providing a surfactant component to the reactor thereby altering viscosity of said hydrogen-generating composition.

25. A method as set forth in claim 1 wherein the alcoholysis reaction is exothermic and substantially free of the application of heat from an external source to the reactor.

26. A method as set forth in claim 1 further comprising the step of providing an acid component to said reactor thereby at least one of triggering and accelerating the rate of formation of the hydrogen gas.

27. A method as set forth in claim 1 wherein said hydrogen-generating composition is a liquid mixture substantially free of water.

28. A method as set forth in claim 1 wherein said hydrogen-generating composition is a liquid mixture including water.

29. A method as set forth in claim 11 wherein the acid is acetic acid.

30. A method as set forth in claim 10 wherein said pH component comprises a base thereby decreasing the rate of formation of the hydrogen gas.

31. A method as set forth in claim 10 wherein said pH component comprises a buffer thereby maintaining the rate of formation of the hydrogen gas.

32. A sodium borate complex generally having the formula $(NaB)_3[H_5(CO)_3]_4$, said sodium borate complex prepared using the method as set forth in claim 1.

33. A sodium borate complex as set forth in claim 32 wherein said reaction product is formed in the absence of water.

34. A method of forming hydrogen gas, said method comprising the steps of:
   providing a reactor;
   providing a hydrogen-generating composition to said reactor, said hydrogen-generating composition consisting essentially of a borohydride component comprising sodium borohydride ($NaBH_4$) and a glycerol component in a stoichiometric ratio of generally three to at least four, said borohydride component having hydrogen atoms and said glycerol component having hydroxyl groups with hydrogen atoms; and
   directly reacting said borohydride component with said glycerol component in an alcoholysis reaction thereby converting substantially all of said hydrogen atoms present in said borohydride component and substantially all of said hydrogen atoms present in said hydroxyl groups of said glycerol component to form the hydrogen gas and a sodium borate complex generally having the formula $(NaB)_3[H_5(CO)_3]_4$, the alcoholysis reaction starting at a temperature of less than about 39 degrees Celsius.

* * * * *